(12) United States Patent
Austin et al.

(10) Patent No.: US 11,151,366 B2
(45) Date of Patent: Oct. 19, 2021

(54) SYSTEMS AND METHODS FOR OCCLUDING VEHICLE OCCUPANT COMMUNICATION

(71) Applicant: Toyota Motor Engineering & Manufacturing North America, Inc., Plano, TX (US)

(72) Inventors: Benjamin P. Austin, Saline, MI (US); Joshua E. Domeyer, Madison, WI (US); John K. Lenneman, Okemos, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 16 days.

(21) Appl. No.: 16/777,010

(22) Filed: Jan. 30, 2020

(65) Prior Publication Data
US 2021/0240972 A1    Aug. 5, 2021

(51) Int. Cl.
*G06K 9/00* (2006.01)
*G06K 9/62* (2006.01)

(52) U.S. Cl.
CPC ..... *G06K 9/00369* (2013.01); *G06K 9/00838* (2013.01); *G06K 9/6288* (2013.01)

(58) Field of Classification Search
None
See application file for complete search history.

(56) References Cited

U.S. PATENT DOCUMENTS

| | | | |
|---|---|---|---|
| 7,245,205 B2 * | 7/2007 | Strohband | B32B 17/10504 340/426.27 |
| 8,630,768 B2 | 1/2014 | McClellan et al. | |
| 9,196,164 B1 | 11/2015 | Urmson et al. | |
| 10,043,084 B2 | 8/2018 | Zhou et al. | |
| 10,115,929 B2 * | 10/2018 | Huang | H01L 51/5237 |
| 10,118,548 B1 | 11/2018 | Fields et al. | |
| 10,187,615 B1 * | 1/2019 | Schofield | B60R 1/12 |
| 10,196,058 B2 | 2/2019 | Paris et al. | |
| 10,293,666 B2 * | 5/2019 | Choi | B60K 37/04 |
| 10,562,379 B2 * | 2/2020 | Ghannam | B60J 3/04 |
| 10,576,809 B2 * | 3/2020 | Lota | B60H 1/00742 |
| 10,591,922 B2 * | 3/2020 | Sakai | G08G 1/165 |
| 2014/0019005 A1 * | 1/2014 | Lee | G08G 1/0962 701/36 |
| 2016/0363993 A1 | 12/2016 | Leng | |
| 2017/0050642 A1 | 2/2017 | Heckmann et al. | |
| 2017/0103592 A1 * | 4/2017 | Buttolo | G07C 9/21 |
| 2017/0131719 A1 | 5/2017 | Micks et al. | |
| 2018/0065453 A1 * | 3/2018 | Gaddis | G02F 1/0147 |

(Continued)

*Primary Examiner* — Anand P Bhatnagar
(74) *Attorney, Agent, or Firm* — Christopher G. Darrow; Darrow Mustafa PC (57) ABSTRACT

System, methods, and other embodiments described herein relate to addressing occluding potential miscommunication from an occupant of an autonomously operated vehicle. A method of occluding communication from an occupant of an autonomously operated vehicle includes generating sensor data indicating one or more aspects of an environment around the vehicle, analyzing the sensor data to identify a presence of an individual outside of the vehicle determining a position of the individual relative to an occupant inside the vehicle, and occluding at least a portion of at least one window between the individual and the occupant.

17 Claims, 6 Drawing Sheets

(56) References Cited

U.S. PATENT DOCUMENTS

| | | |
|---|---|---|
| 2018/0126986 A1 | 5/2018 | Kim et al. |
| 2018/0141414 A1 | 5/2018 | Lota |
| 2018/0276986 A1 | 9/2018 | Delp |
| 2019/0152303 A1* | 5/2019 | Ghannam .................. B60J 3/04 |
| 2019/0171215 A1 | 6/2019 | Tatourian |
| 2019/0310633 A1 | 10/2019 | Toyoda |
| 2019/0346701 A1* | 11/2019 | Lam ................... G06K 9/00845 |

* cited by examiner

SYSTEMS AND METHODS FOR OCCLUDING VEHICLE OCCUPANT COMMUNICATION

TECHNICAL FIELD

The subject matter described herein relates, in general, to systems and methods for preventing miscommunication by an occupant of an autonomously operated vehicle, and, more particularly, occluding at least a portion of a window between an occupant of the autonomously operated vehicle and an individual detected outside of the vehicle to prevent miscommunications.

BACKGROUND

As technological trends in transportation transition toward increased automation, vehicles with autonomous capabilities become more and more prevalent. During this transition, however, pedestrians, bicyclists and other drivers will continue to look to a driver or person who appears to be the driver for cues on how to negotiate close encounters with vehicles, even in the case of vehicles that are operating in an autonomous mode. For example, at a section of road that includes a crosswalk without a stop sign or traffic light, a pedestrian approaching the crosswalk at around the same time that a vehicle is arriving will look to the driver for an indication as to whether the driver has noticed the pedestrian and intends to slow down to allow the pedestrian to pass. The driver may speak, mouth words, or show a gesture, such as a nod or a wave, to indicate intent to allow the pedestrian to cross. In other cases, the driver may continue to look straight ahead without turning toward the pedestrian, i.e., body language that the pedestrian may interpret as indicating no intent to slow down. Thus, the pedestrian can take appropriate care in waiting to enter the crosswalk.

Such visual cues and verbal and non-verbal communication are currently quintessential in safely completing close encounters between pedestrians and moving vehicles. For better or worse, this type of communication exchange is ingrained in modern cultural conduct such that it can occur between parties on both sides automatically with little or no thought. Challenges arise, for example, when a passenger of an autonomously operated vehicle is seated in a driver's seat or other seat of a vehicle, riding without being in immediate control of the vehicle. A pedestrian might automatically look, incorrectly, to the passenger for an indication on how the vehicle will behave to inform the pedestrian how to safely negotiate the close encounter. This modern challenge, in fact, can arise dangerously in many different types of situations, including encounters between servicepersons, moving vehicles and bicyclists, motorcycles and other moving vehicles.

SUMMARY

The disclosed systems and methods relate to preventing a miscommunication from occurring between an occupant of an autonomous operating vehicle and an individual outside of the vehicle by occluding at least a portion of a window of a between the occupant and the individual. The disclosed systems and methods improve the chances of achieving safe outcomes in close encounters between autonomously operated vehicles and others that share the road with, or are within the vicinity of, the autonomously operated vehicle.

In one embodiment, an occlusion system for an autonomously operated vehicle includes one or more sensors configured to generate sensor data indicating one or more aspects of an environment around the vehicle, one or more processors, and a memory communicably coupled to the one or more processors and storing a monitoring module including instructions that when executed by the one or more processors cause the one or more processors to analyze the sensor data from the one or more sensors to identify a presence of an individual outside of the vehicle and determine a position of the individual relative to an occupant inside the vehicle, and an occlusion module including instructions that when executed by the one or more processors cause the one or more processors to occlude at least a portion of at least one window between the individual and the occupant.

In another embodiment, a method of occluding communication from an occupant of an autonomously operated vehicle includes generating sensor data indicating one or more aspects of an environment around the vehicle, analyzing the sensor data to identify a presence of an individual outside of the vehicle determining a position of the individual relative to an occupant inside the vehicle, and occluding at least a portion of at least one window between the individual and the occupant.

In another embodiment, a non-transitory computer-readable medium for occluding communication from an occupant of an autonomously operated vehicle includes instructions that, when executed by one or more processors, cause the one or more processors to generate sensor data indicating one or more aspects of an environment around the vehicle, analyze the sensor data to identify a presence of an individual outside of the vehicle determine a position of the individual relative to an occupant inside the vehicle, and occlude at least a portion of at least one window between the individual and the occupant.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments associated with preventing an occupant of an autonomously operated vehicle from unintentionally miscommunicating a vehicle behavior are disclosed. As mentioned previously, pedestrians, as well as bicyclists, servicepersons and other drivers, may automatically look to an occupant seated in the driver's seat of an autonomously operated vehicle for a visual cue regarding how to negotiate an encounter. Such encounters may commonly occur, for example, at crosswalks, intersections (particularly intersections without traffic lights), in parking lots, along narrow roads, etc. Situations that commonly invoke nonverbal communication, visual cues, or even verbal communication between a driver of a vehicle and a person outside of the vehicle (e.g., pedestrian, bicyclist, other driver, etc.) in order to negotiate safe passage will be generally referred to herein as "communication encounters." The disclosed embodiments can improve the likelihood of safe outcomes in communication encounters between autonomously operated vehicles and others in the vicinity.

An autonomous vehicle (or vehicle operating in autonomous mode) can include a navigational system and one or more systems, such as an autonomous driving module, that determine routes as well as immediate driving maneuvers and trajectory plans for the vehicle as the vehicle travels along a route. The vehicle can further include one or more external sensors that can detect aspects of an environment through which the autonomous vehicle travels. The disclosed embodiments can, in addition to these features, include an internal monitoring system that monitors, for example, body language, spoke words, or mouthed words of one or more occupants of the vehicle.

The disclosed occlusion system can, based on sensor data from the external sensors, identify and/or predict upcoming communication encounters. For example, external sensor data may indicate that an individual is present near the side of the road ahead of the vehicle. In one or more embodiments the disclosed system can analyze the sensor data to attempt to determine a direction of attention for the individual, e.g., by determining a gaze direction, a direction that the individual is facing, a direction the individual is moving (e.g., walking toward the road), etc. Based on such factors the disclosed occlusion system may determine that a communication encounter is about to occur.

When the vehicle is approaching a communication encounter (e.g., a crosswalk that a pedestrian is also approaching) the autonomous driving module can automatically determine a trajectory plan according to the available data, such as map data, sensor data, traffic data, etc. However, the occupant of the autonomous vehicle may also, intentionally or unintentionally, make a mental judgment call as to how the communication encounter should be resolved, or how they predict the communication encounter will be solved. Furthermore, intentionally or unintentionally, the occupant may reflexively perform a gesture reflecting the mental judgment call. This gesture would not be informed by the trajectory plan which the autonomous driving module has automatically determined for the autonomous vehicle and, in fact, may be in exact opposition to the trajectory plan.

For example, referring to the crosswalk scenario, the trajectory plan may include the autonomous vehicle not yielding to the pedestrian but instead passing directly through the crosswalk. Unaware of the trajectory plan, the occupant of the autonomous vehicle may casually glance at the pedestrian, nod, or inadvertently perform a gesture that the pedestrian interprets as indicating that the vehicle will allow the pedestrian to cross the crosswalk ahead of the vehicle.

The disclosed embodiments provide several ways to prevent or occlude such potentially dangerous miscommunications from occurring between an occupant of the autonomous vehicle and an individual outside of the vehicle. In one or more embodiments, the disclosed occlusion system can, for example, determine a portion of a window to occlude, determine an entire window to occlude, control external communication devices to indicate behavior of the vehicle or take other measures to prevent the miscommunication from occurring. Generally, the occlusions can function as part of an attempt to direct an outside individual's attention to one or more signal devices that are controlled by the vehicle. These devices can accurately communicate the true upcoming behavior of the vehicle, thereby increasing the likelihood that external parties will be correctly informed about the intention and future movement of the vehicle.

Figure 1:
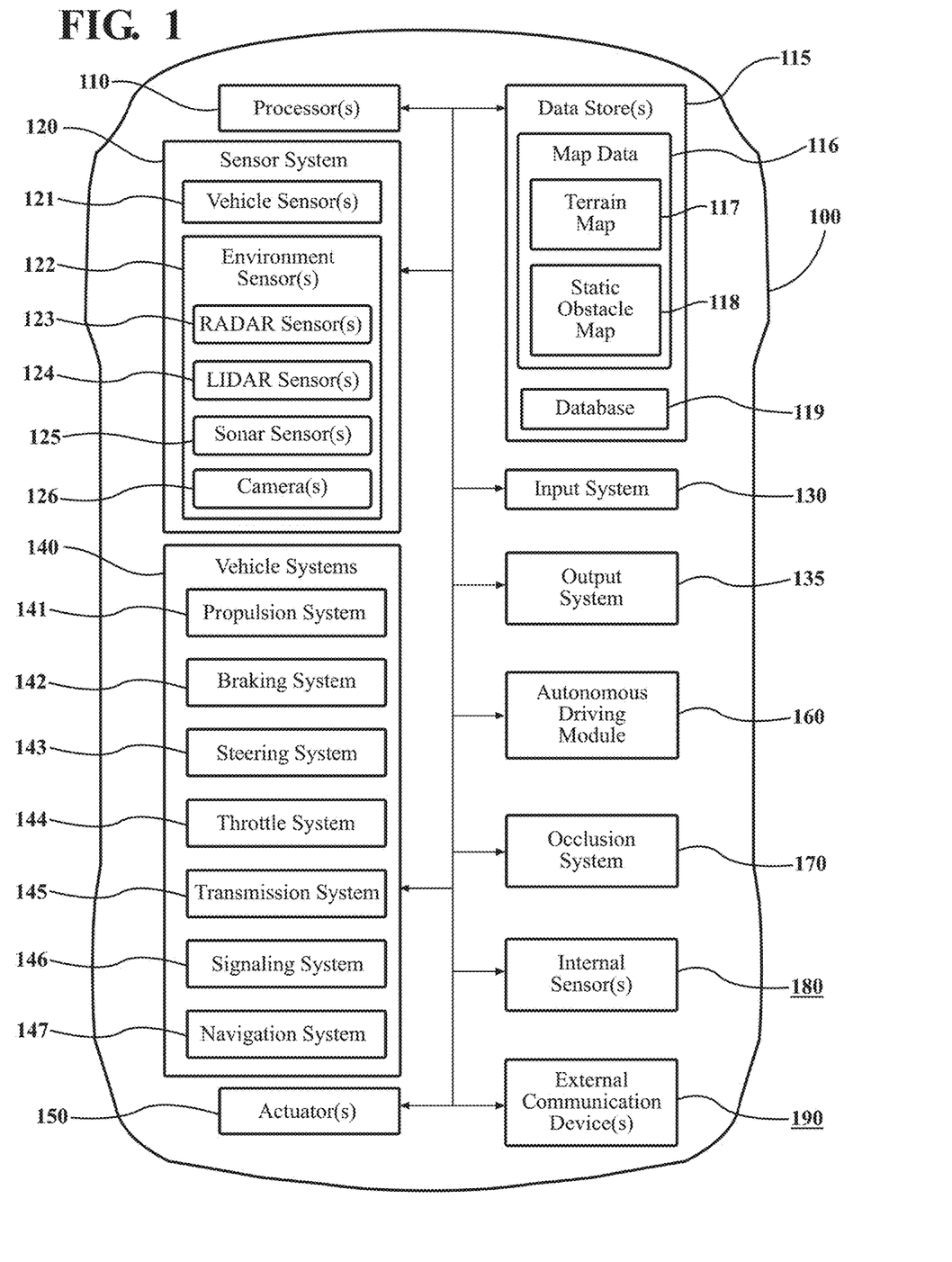
FIG. 1 illustrates one embodiment of a vehicle within which systems and methods disclosed herein may be implemented.

Referring to FIG. 1, an example of a vehicle 100 is illustrated. As used herein, a "vehicle" is any form of powered transport. In one or more implementations, the vehicle 100 is an automobile, e.g., a hybrid/electric automobile, an autonomous/semi-autonomous automobile, a combination thereof, etc., that is capable of operating in an autonomous mode. While arrangements will be described herein with respect to automobiles, it will be understood that embodiments are not limited to automobiles. In some implementations, the vehicle 100 may be any form of powered transport that, for example, can carry an occupant who may inadvertently communicate in a manner inconsistent with an autonomously created trajectory plan of the transport, and thus can benefit from the functionality discussed herein.

As shown in FIG. 1, the vehicle 100 includes multiple elements. It should be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances.

Some of the possible elements of the vehicle 100 are shown in FIG. 1 and will be described along with subsequent figures. However, a more detailed description of many of the elements in FIG. 1 will be provided after the discussion of FIGS. 1-6 for purposes of brevity in this description. It will be appreciated that for simplicity and clarity of illustration, where appropriate, reference numerals have been repeated among the different figures to indicate corresponding or analogous elements. In addition, while the discussion outlines numerous specific details to provide a thorough understanding of the embodiments described herein, those of skill in the art, will understand that the embodiments described herein may be practiced using various combinations of these elements.

In any case, the vehicle 100 includes an occlusion system 170 that is implemented to perform methods and other functions as disclosed herein relating to preventing a miscommunication from an occupant of the vehicle 100 to an individual outside of the vehicle 100. The noted functions and methods will become more apparent in the following discussion of the figures.

Figure 2:
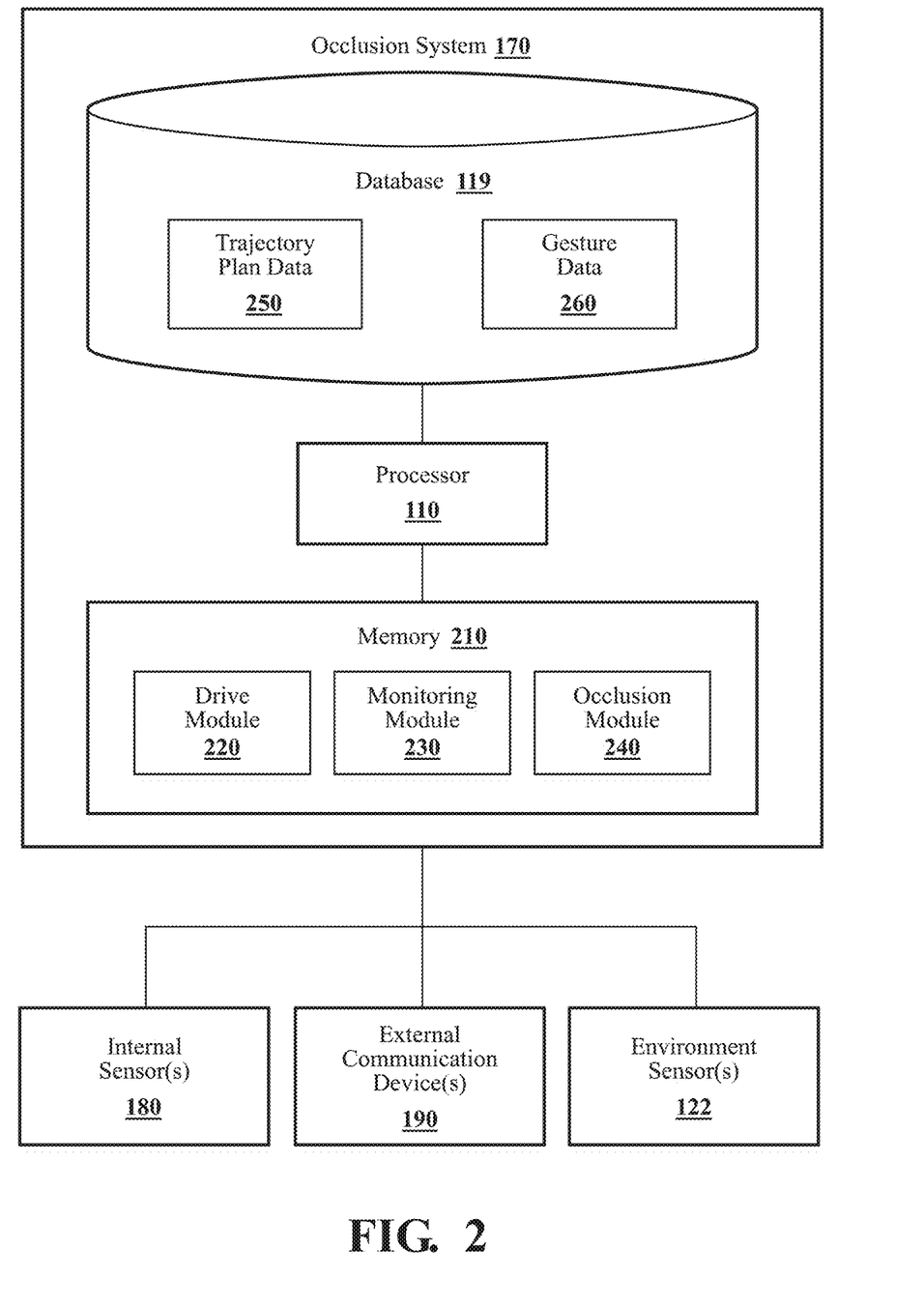
FIG. 2 illustrates one example of an occlusion system according to the disclosed embodiments.

With reference to FIG. 2, one embodiment of the occlusion system 170 of FIG. 1 is illustrated. The occlusion system 170 is shown as including a processor 110 and database 119 from the vehicle 100 of FIG. 1. Accordingly, the processor 110 may be a part of the occlusion system 170, the occlusion system 170 may include a separate processor from the processor 110 of the vehicle 100 or the occlusion system 170 may access the processor 110 through a data bus or another communication path.

In one or more embodiments, the occlusion system 170 is operably connected with one or more internal sensors 180 that are configured to detect movement, position, sounds and/or body language of an occupant of the vehicle, one or more external communication devices 190 that can be utilized to indicate a forthcoming vehicle behavior, such as an intention to drive forward, an intention to stop, an intention to turn, etc., and one or more environment sensors 122 configured to detect one or more aspects of an environment outside of the vehicle 100.

The occlusion system 170 includes a database 119 that stores, among other things, trajectory plan data 250 and gesture data 260, as will be discussed further below. The database 119, in one embodiment, is constructed as an electronic data structure stored in the memory 210 or another data store, such as the vehicle 100 data store 115, a cloud-based storage, a removable memory device, or another suitable location that is accessible to the modules 220, 230 and 240. The database 119 is configured with routines that can be executed by the processor 110 for analyzing stored data, providing stored data, organizing stored data, and so on. Thus, in one embodiment, the database 119 stores data described above (as well as other data) used by the modules 220, 230 and 240 in executing various functions.

Additionally, the occlusion system 170, in one embodiment, includes a memory 210 that stores a drive module 220, monitoring module 230 and an occlusion module 240. The memory 210 can be constructed as a random-access memory (RAM), read-only memory (ROM), a hard-disk drive, a flash memory, or other suitable memory for storing the modules 220, 230 and 240. The modules 220, 230 and 240 are, for example, constructed as computer-readable instructions that when executed by the processor 110 cause the processor 110 to perform the various functions disclosed herein.

The drive module 220 is generally constructed including instructions that function to control the processor 110 to obtain a trajectory plan for the vehicle 100 and store the plan as trajectory plan data 250. A trajectory plan as used herein refers to data related to controlling the aspects of the upcoming trajectory of the vehicle 100, particularly in an autonomous operation mode, for example, including speed data, brake data, steering data, navigation data, obstacle avoidance data and other types of data that can affect an upcoming trajectory of the vehicle 100. For example, trajectory plan data 250 can include data indicating the autonomous drive module 160 will maintain a current speed of 45 mph for the next 300 feet and thereafter begin to slow down for an upcoming stop sign.

The drive module 220 can obtain the trajectory plan, for example, from the autonomous driving module 160 (FIG. 1) or one or more other electronic control components of the vehicle 100. In one or more embodiments the drive module 160 can obtain or compile a most current version of a trajectory plan and continuously update the trajectory plan data 250 with the most current version of the trajectory plan.

The monitoring module 230 is constructed including instructions that function to control the processor 110 to analyze sensor data from the external sensors 122 to identify a presence of an individual outside of the vehicle 100 and determine a position of the individual relative to an occupant inside the vehicle 100. The monitoring module 230 can further analyze the sensor from the external sensors 122 to identify an attention direction of the individual. As will be discussed further below, in one or more embodiments the monitoring module 230 can identify multiple individuals simultaneously and respectively determine each individual's attention direction and relative distance from the vehicle 100.

The monitoring module 230 can further include instructions that function to control the processor 110 to analyze sensor data from one or more internal sensors 180 to determine a communication indication by an occupant of the vehicle 100 (e.g., a person sitting in the driver's seat or a passenger seat of the vehicle 100). More specifically, in one or more embodiments the monitoring module 230 can determine a gesture, movement or verbal or non-verbal communication indication exhibited by the occupant of the vehicle 100.

The occlusion module 240 is constructed including instructions that function to control the processor 110 to occlude at least a portion of at least one window of the vehicle 100 between an occupant of the vehicle 100 and an individual detected outside of the vehicle 100. The occlusion function can be implemented, for example, by dynamic window tint, electrically controlled tinting regions (e.g., electrochromic glass), nanocrystal-embedded glass, adjustable window frost, or other types of controllable occlusions that may be configured in one or more windows of the vehicle 100.

In one or more embodiments, the occlusion module 240 can further include instructions that function to control the processor 110 to occlude at least a portion of at least one window when the monitoring module 230 detects a communication from the occupant that is inconsistent with an upcoming vehicle behavior (e.g., based on the trajectory plan data 250), and to not occlude the at least one window when the monitoring module 230 detects a communication from the occupant that is consistent with upcoming vehicle behavior.

In addition, the occlusion module 240 can include instructions to control the external communication device(s) 190 to emphasize an upcoming vehicle behavior when the occlusion module 240 creates an occlusion. In this manner the occlusion and the external communication device(s) 190 operate in conjunction to direct the attention of the outside individual away from the occupant of the vehicle 100 and toward the accurate signals of vehicle behavior that are controlled by the vehicle 100. In one or more embodiments, the occlusion module 240 can additionally control one or more windows to display a message in accordance with an upcoming behavior. For example, if an upcoming vehicle behavior is to yield to a pedestrian, the occlusion module 240 can control the window (tint, frost, etc.) to display a message "Please cross the street".

Figure 3:
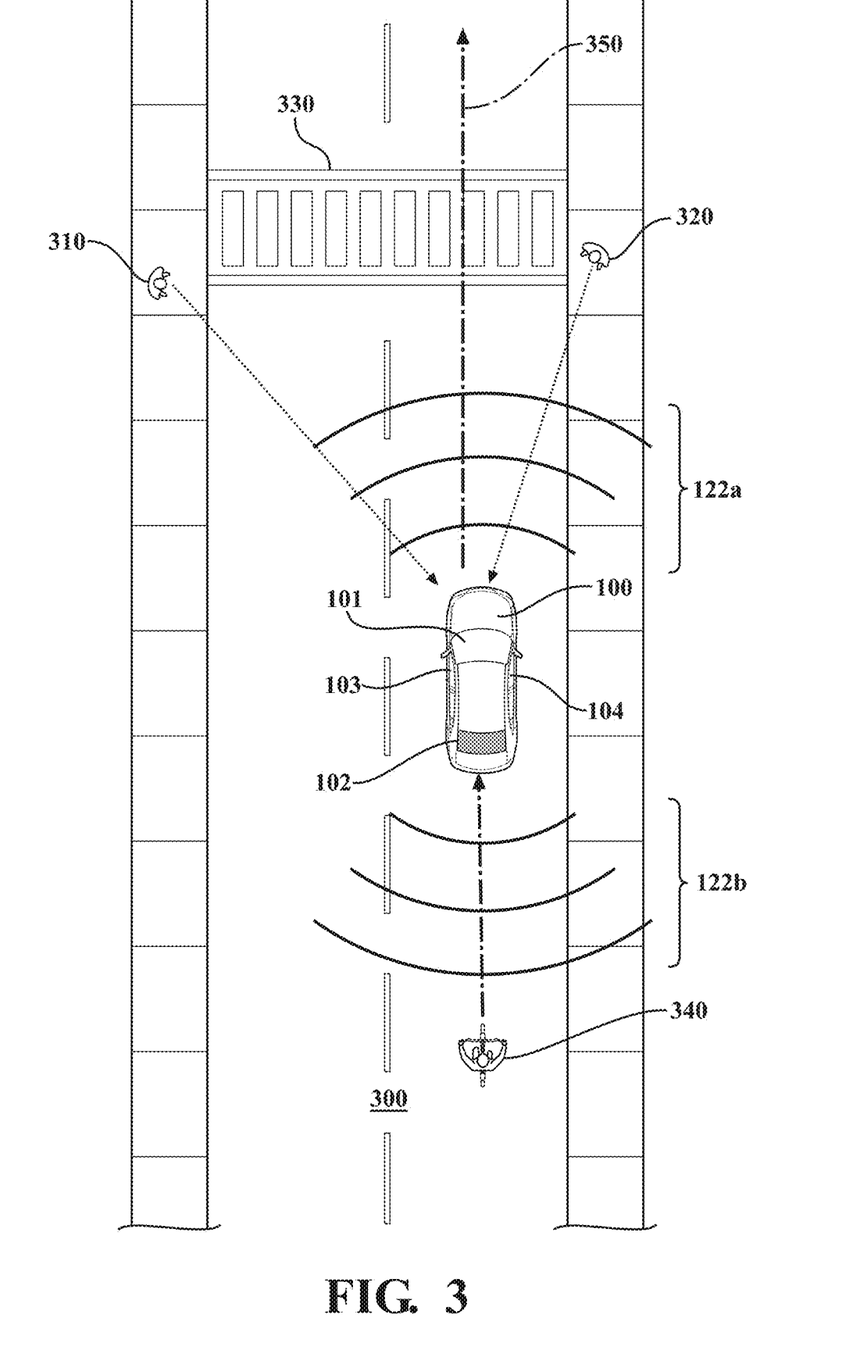
FIG. 3 illustrates an example communication encounter which may be addressed by an occlusion system according to the disclosed embodiments.

FIG. 3 shows an example communication encounter 300 in which a miscommunication from an occupant of an autonomously operated vehicle may be addressed by an occlusion system 170 according to the disclosed embodiments. Multiple pedestrians 310, 320 are approaching a crosswalk 330 as the vehicle 100, operating in autonomous mode, also approaches the crosswalk 330. A bicyclist 340 follows behind the vehicle 100. The vehicle 100 includes a front windshield 101, a rear window 102, left side windows 103 and right side windows 104. As will be discussed below, the entire rear window 102 is occluded.

Before crossing the crosswalk 330 the pedestrians 310, 320 momentarily pause and look toward the vehicle 100, searching for a cue as to how to negotiate the encounter. That is, although the pedestrians 310, 320 may have the right-of-way due to the presence of the crosswalk 330, before crossing the crosswalk 330 the pedestrians 310, 320 seek assurance from the driver of the vehicle 100 that the driver will respect their right-of-way. Similarly, the bicyclist 340 may look toward the vehicle 100 for a sign of acknowledgment before attempting to pass the vehicle 100.

The monitoring module 230 analyzes data from signal 122*a*, 122*b* generated by environment sensors 122 and detects the presence of the pedestrians 310, 320 and the bicyclist 340 and their positions relative to the vehicle 100. That is, for example, the monitoring module 230 determines that a first pedestrian 310 is present approximately 110 meters ahead of the vehicle 100 and to the left, a second pedestrian 320 is present approximately 100 meters ahead of the vehicle 100 and to the right, and a bicyclist 340 is present approximately 20 meters behind the vehicle 100 to the right.

To prevent a potential miscommunication from occurring between an occupant of the vehicle 100 and any of the detected individuals (310, 320, 340), in one or more embodiments the occlusion module 240 can automatically occlude one or more portions of the windows 101-104 of the vehicle 100. The parameters for determining when to occlude, which window to occlude and which portion the window to occlude can vary across different implementations and, in one or more embodiments, can be controlled by adjusting parameter settings. In a basic implementation, for example, the occlusion module 240 can simply occlude any entire window that is between the occupant and an individual detected outside of the vehicle 100 within a threshold range. The threshold range can be, for example, a predetermined range (e.g., 100 meters) or a distance determined as a function of the current speed of the vehicle 100.

In the basic implementation, referring to FIG. 3 in which the bicyclist 340 is detected approximately 20 meters behind the vehicle 100, the occlusion module 240 will, as shown in the figure, automatically occlude the entire rear window 102, which is between the bicyclist 340 and the occupant of the vehicle 100. The occlusion will prevent or obscure the bicyclist 340 from seeing the occupant of the vehicle 100, thereby reducing the risk of any movement by the occupant being seen and interpreted as a communication to the bicyclist 340 regarding the behavior of the vehicle 100. For example, with the vehicle 100 operating in autonomous mode an occupant seated in the front seat may freely turn around to attend to a child in the rear seat. The occupant may inadvertently wave her hands in a manner that, if seen by the bicyclist 340, may be misinterpreted as a signal for the bicyclist to pass by. Such a miscommunication may be avoided by the occlusion module 240 occluding the rear window 102.

Further discussing the basic implementation applied to FIG. 3, although the monitoring module 230 detects pedestrians 310 and 320 at approximate distances of 110 meters and 100 meters, respectively, since these individuals are not within the threshold range (e.g., 100 meters), the occlusion module 240 will not take any action in response to their detection. As the vehicle 100 continues toward them, however, when the monitoring module 230 detects that the pedestrians 310 and 320 are within the threshold range the occlusion module 240 will occlude the entire front window 101, since it is between the occupant of the vehicle 100 and the pedestrians 310 and 320.

In other more advanced implementations, the occlusion module 240 can more selectively occlude one or more portions of the windows 101-104, the one or more portions being less than the full window. Selective occlusion of a portion of a window instead of the entire window can allow the occupant to enjoy a greater visibility area through the window and may be less disruptive to the occupant. Indeed, in some cases the occupant may not notice the occlusion or the occlusion module 240 may determine that although an individual is detected outside of the vehicle 100 within the threshold range, current circumstances do not warrant activating an occlusion. Accordingly, as will be discussed below, in one or more implementations the occlusion module 240 can determine to execute a partial occlusion, determine a position of the partial occlusion, or determine to forego occlusion based at least in part on one or more of: detected body language of the occupant, the current trajectory plan of the vehicle 100, and the attention direction of the individual detected outside of the vehicle 100.

Figure 4:
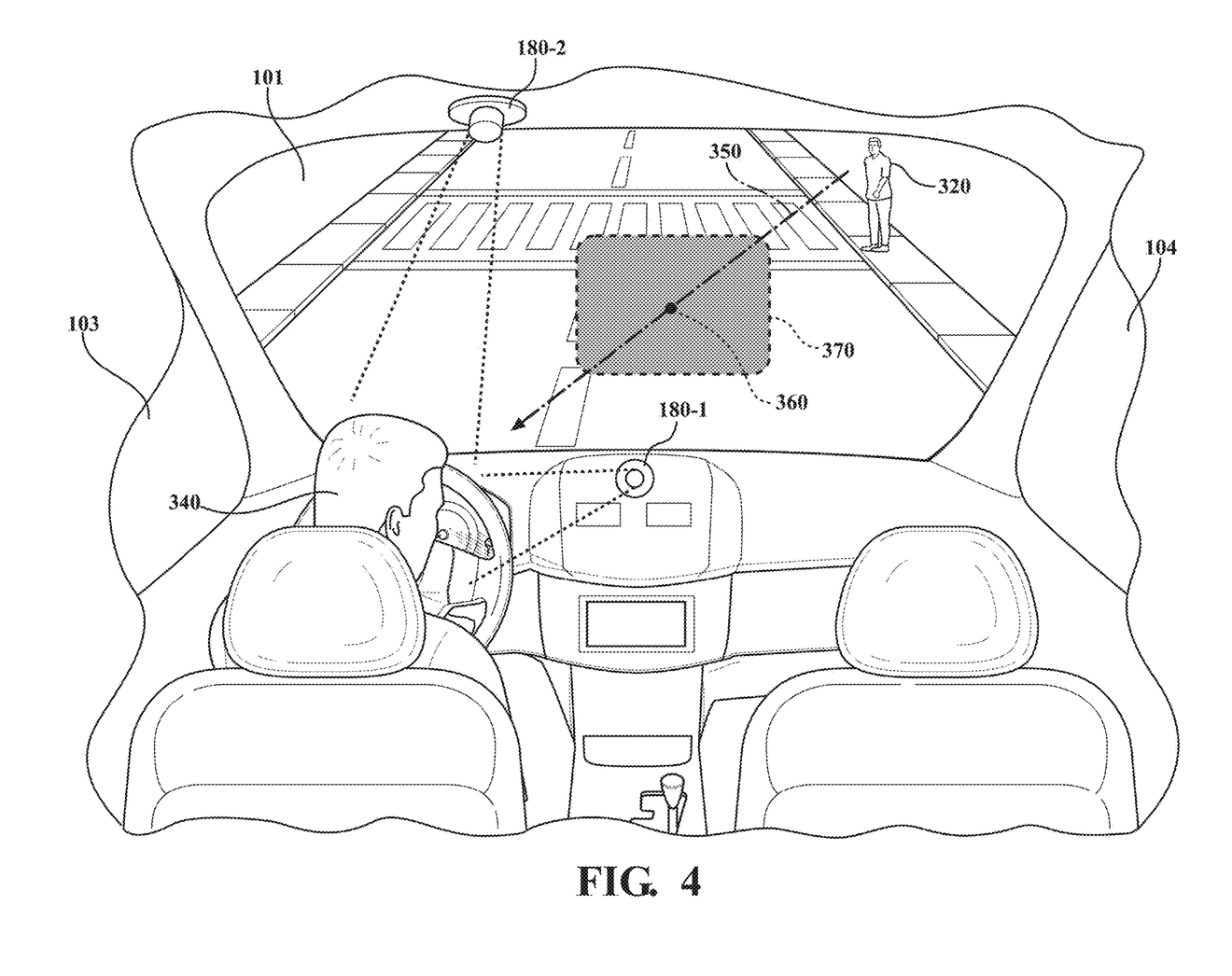
FIG. 4 illustrates another view of the example communication encounter which may be addressed by an occlusion system according to the disclosed embodiments.

An example partial occlusion scenario based in part on detected body language of the occupant will now be discussed. In this scenario, the occupant (not shown) of the vehicle 100 in FIG. 3, well aware of the right-of-way of the pedestrian 320, automatically nods toward him. FIG. 4 shows a view of the communication encounter 300 from inside the vehicle 100. Although the occupant 340 is illustrated in a front driver seat, the invention is not limited to this seating position and the occupant 40 can be seated in any seat in the vehicle 100. Internal sensors 180 monitor the occupant 340 to detect body language of the occupant 340. For example, in one or more embodiments a first sensor 180-1 is configured to detect body motions and gestures while a second sensor 180-2 is configured to track eye movement and detect gaze direction. The internal sensors 180 can be implemented, for example, as microphones, cameras, LIDAR or other types of sensors that can detect body movement.

In one or more embodiments, the monitoring module 230 (FIG. 2) can include a machine learning algorithm, such as a trained neural network, configured to analyze data generated by the internal sensors 180 to classify body language and detect when the occupant 340 performs a movement or gesture or otherwise maintains a position that can communicate an intended driving behavior. Thus, the monitoring module 230 can be configured to monitor the occupant 340 and detect, for example, a head motion (e.g., nod or shaking the head), a hand motion (e.g., wave or palm out), a glance in the direction of a potential communication recipient (e.g., pedestrian 320), a gaze directed away from a potential communication recipient, or other types motions, movements, positions or gestures that may be interpreted as a communication of intended vehicle behavior. Based at least in part on the detection, the monitoring module 230 can determine a verbal or non-verbal communication indication from the occupant 340.

Returning to FIG. 4, as the vehicle 100 approaches the communication encounter the monitoring module 230 analyzes sensor data from internal sensors 180 and detects that the occupant 340 has nodded toward the pedestrian 320. The monitoring module 230 determines that this body language is a non-verbal communication indication that equates to "go ahead", which is an indication of an intended vehicle behavior of yielding.

The occlusion module 240 can compare the non-verbal communication indication detected by the monitoring module 230 against the current trajectory plan of the vehicle 100 as indicated in the trajectory plan data 250 (FIG. 2). The occlusion module 240 can determine that the non-verbal communication indication (e.g., yield) and the current trajectory plan (e.g., maintain current speed) are inconsistent. To immediately curtail the potentially dangerous miscommunication the occlusion module 240 can determine a portion of a window of the vehicle 100 to occlude. Based on the detected position of the occupant 340 (e.g., the detected position of the occupant's head) and the detected position of the pedestrian 320, the occlusion module 240 can calculate a line-of-sight estimate 350. The occlusion module 240 can determine that the line-of-sight estimate 350 intersects the front windshield 101 at an intersect point 360 and generate a partial occlusion 370 around the intersect point 360. The partial occlusion 370 occludes less than the full front windshield 101 and is of a size large enough, for example, to obscure or prevent the individual 320 from seeing the occupant 340.

Furthermore, as previously mentioned in one or more embodiments the vehicle 100 may be equipped with one or more external communication devices 190, such as headlights, additional lights, a display panel, an audio device, or other external communication device. In one or more embodiments, when the occlusion module 240 implements a full occlusion or a partial occlusion, the occlusion module 240 can control the one or more external communication devices 190 to signal vehicle behavior in accordance with the current trajectory plan. For example, in one or more embodiments the occlusion module 240 can cause a head light or secondary light bar to blink twice, indicating that the vehicle 100 will allow the pedestrian to proceed, or flash a long held light warning that the vehicle 100 is proceeding. To further emphasize the current trajectory plan the occlusion module 240 can intensify the signal, for example, by changing colors or brightening lights. The emphasis, combined with the occlusion, operates in conjunction to draw the attention of the outside individual(s) to the signal and increases the likelihood that the individual(s) will be correctly informed of the upcoming trajectory of the vehicle 100.

Conversely, referring back to FIG. 3, in another scenario as the vehicle 100 approaches the communication encounter 300 the monitoring module 230 can analyze sensor data from internal sensors 180 and detect that the occupant 340 is looking straight forward instead of looking toward the pedestrian 310 ahead on the left side of the vehicle 100. The monitoring module 230 can determine that this detected body language is equivalent to a non-verbal communication indication of a vehicle behavior of intending to proceed ahead without yielding, which is consistent with the current trajectory plan for the vehicle 100. In this case, since no miscommunication is occurring the occlusion module 240 can forego occluding the front windshield 101 in response to the detection of individual 310.

Similarly, the monitoring module 230 can analyze sensor data from the environment sensors 122 and determine an attention direction of the pedestrian. For example, the monitoring module 230 can determine that the detected pedestrian 310 is walking away from the vehicle (e.g., the pedestrian 310 has crossed the street already and is continuing away). In this case, since the attention direction of the pedestrian 310 is not directed toward the vehicle 100, no miscommunication is occurring and the occlusion module 240 can forego occluding the front windshield 101 in response to the detection of individual 310. In contrast, if the monitoring module 230 detects that the attention direction of the pedestrian 310 is directed toward the vehicle 100, the occlusion module 240 can execute a full or partial occlusion as described above.

As shown in FIG. 3, the vehicle 100 may encounter multiple individuals (310, 320, 340) simultaneously in varying degrees of distance and attention. In one or more embodiments the disclosed occlusion system 170 can assess and address each individual situation, resulting in full or partial occlusions being executed and removed as needed. Parallel operations may result in multiple occlusions occurring, e.g., an occlusion on the rear window 102 simultaneously with an occlusion on a front windshield 101. Thus, the monitoring module 230 can continuously monitor the position, distance and attention direction of multiple individuals simultaneously and the occlusion module 240 can execute multiple responsive occlusions as the needs arise.

Figure 5:
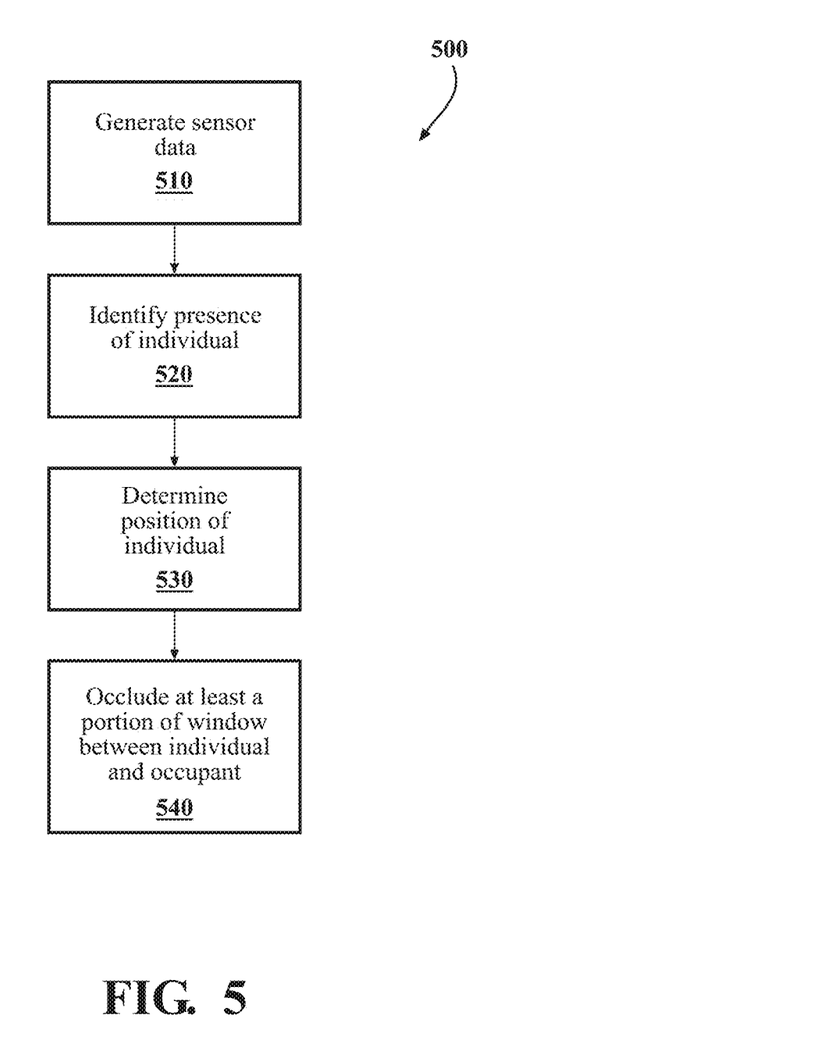
FIG. 5 illustrates a flowchart of a method of occluding communication from an occupant of an autonomously operated vehicle according to the disclosed embodiments.

FIG. 5 illustrates a flowchart of a method 500 of preventing miscommunication from an occupant of an autonomously operated vehicle according to the disclosed embodiments. Method 500 will be discussed from the perspective of the occlusion system 170 of FIGS. 1 and 2. While method 500 is discussed in combination with the occlusion system 170, it should be appreciated that the method 500 is also not limited to being implemented within the occlusion system 170 but is instead one example of a system that may implement the method 500.

At operation 510, the occlusion system 170, e.g., the environment sensors 122, generates sensor data indicating one or more aspects of an environment around the vehicle 100.

At operation 520, the occlusion system 170, e.g., the monitoring module 230, analyzes the sensor data to identify a presence of an individual outside of the vehicle 100. For example, the individual may be a pedestrian, a serviceperson, a bicyclist, a motorcyclist, or a driver of another vehicle. When more than one individual is present the monitoring module 230 can identify multiple individuals At operation 530 the monitoring module 230, determines a position of the individual(s) relative to an occupant inside the vehicle 100. For example, the monitoring module 230 may determine that the individual is 50 meters ahead of the vehicle 100 the occupant is traveling in, on the right side of the road that the vehicle 100 is traveling.

At operation 540, the occlusion system 170, e.g., the occlusion module 240, occludes at least a portion of at least one window between the individual and the occupant. For example, in a basic implementation setting the occlusion module 240 may simply occlude an entire window of the vehicle 100 that is positioned between the occupant and the individual.

Figure 6:
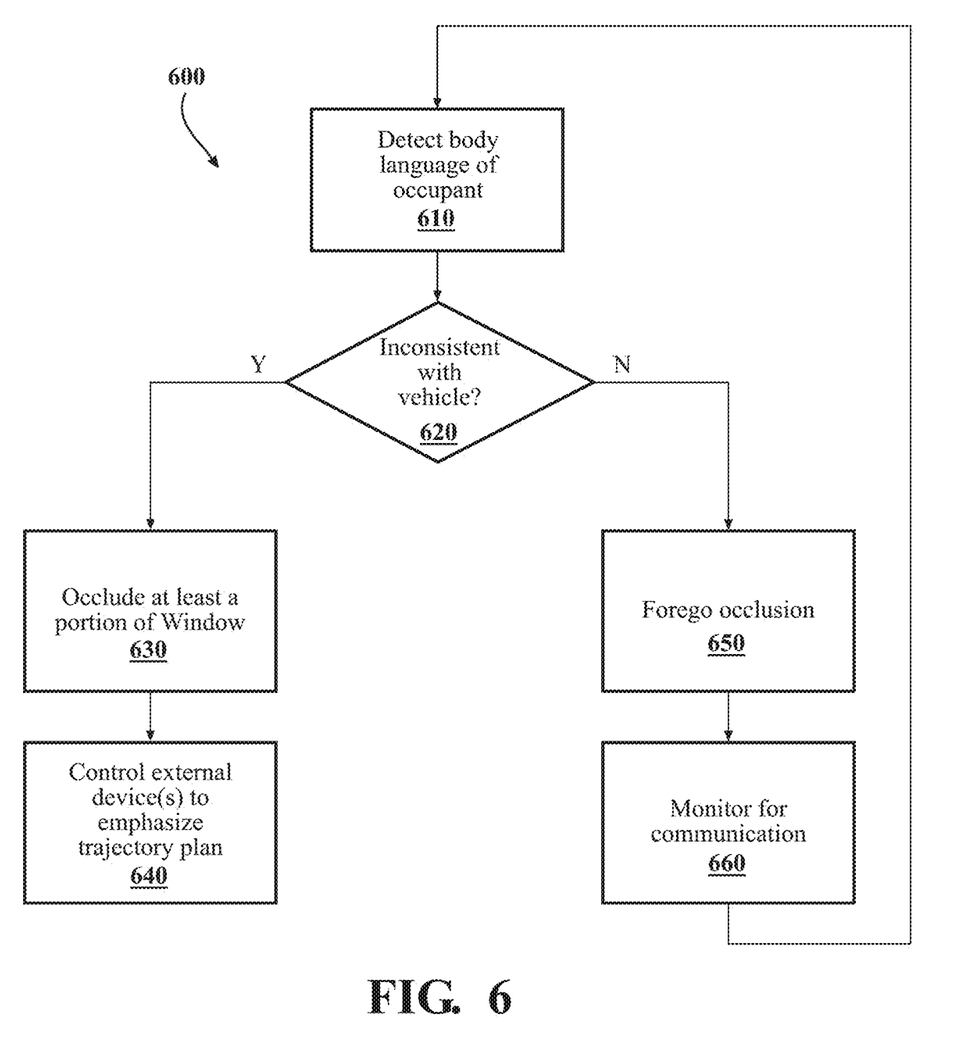
FIG. 6 illustrates a flow chart of a method of occluding based on detecting communication inconsistent with a vehicle behavior according to the disclosed embodiments.

In one or more implementations the occlusion module 240 can execute more advanced occlusion measures, such as occluding less than an entire window and timing occlusions based on conditions or circumstances. FIG. 6 illustrates a flowchart of a method 600 of the occlusion module 240 occluding based on detecting communication inconsistent with a vehicle behavior. At operation 610, the monitoring module 220 detects body language of an occupant. The detection can include non-verbal and verbal communication, such as nodding, waving, speaking, mouthing words, etc.

At operation 620, the monitoring module 230 determines whether the body language is inconsistent with a vehicle behavior. For example, a detected nod (indicating the vehicle 100 will yield right-of-way) may be inconsistent with a trajectory plan of the vehicle 100 to proceed ahead without yielding.

When the detected body language is inconsistent with a vehicle behavior, at operation 630 the occlusion module 240 occludes at least a portion of a window that is between the occupant and the individual. At operation 640 the occlusion module can control the external communication device(s) 190 to emphasize the upcoming trajectory plan of the vehicle 100 to draw attention to the accurate communication.

Conversely, when the detected body language is consistent with the vehicle behavior, at operation 650 the occlusion module 240 forgoes occluding the window. At operation 660 the monitoring module 2230 continues to monitor for any change in communication from the occupant and the process continues at operation 610.

Accordingly, the disclosed occlusion system 170 can improve the safety operation of a vehicle 100 in an autonomous operation mode by reducing the likelihood of a miscommunication from an occupant of the vehicle 100 being seen by an individual outside of the vehicle 100 and dangerously acted upon.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known or later developed. "Manual mode" means that all or a majority of the navigation and/or maneuvering of the vehicle is performed according to inputs received from a user (e.g., human driver). In one or more arrangements, the vehicle 100 can be a conventional vehicle that is configured to operate in either an autonomous mode or a manual mode.

In one or more embodiments, the vehicle 100 is an autonomous vehicle. As used herein, "autonomous vehicle" refers to a vehicle that operates and executes various driving functions autonomously. More specifically, "autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can implement the database 119 (FIG. 2) and can further include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, pedestrians, bicyclists, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g., a driver or a passenger). The vehicle 100 can include an output system 135. An "output system" includes any device, component, or arrangement or groups thereof that enable information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the occlusion system 170 can be configured to determine trajectory plans and travel path(s), and determine current autonomous driving maneuvers for the vehicle 100, future autonomous driving maneuvers and/or modifications to current autonomous driving maneuvers based on data acquired by the sensor system 120 and/or occlusion system 170, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140).

The processor(s) 110, the occlusion system 170, and/or the autonomous driving module(s) 160 can be operatively connected to communicate with the various vehicle systems 140 and/or individual components thereof. For example, returning to FIG. 1, the processor(s) 110, the occlusion system 170, and/or the autonomous driving module(s) 160 can be in communication to send and/or receive information from the various vehicle systems 140 to determine/set a trajectory plan and/or control the movement, speed, maneuvering, heading, direction, etc. of the vehicle 100. The processor(s) 110, the occlusion system 170, and/or the autonomous driving module(s) 160 may control some or all of these vehicle systems 140 and, thus, may be partially or fully autonomous.

The processor(s) 110 and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110 and/or the autonomous driving module(s) 160 can control the direction and/or speed of the vehicle 100, e.g., to move toward an optimal alignment position. The processor(s) 110 and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. An occlusion system for an autonomously operated vehicle, comprising:
    one or more sensors configured to generate sensor data indicating one or more aspects of an environment around the vehicle;
    one or more external communication devices;
    one or more processors; and
    a memory communicably coupled to the one or more processors and storing:
        a monitoring module including instructions that when executed by the one or more processors cause the one or more processors to analyze the sensor data from the one or more sensors to identify a presence of an individual outside of the vehicle and determine a position of the individual relative to an occupant inside the vehicle; and
        an occlusion module including instructions that when executed by the one or more processors cause the one or more processors to occlude at least a portion of at least one window between the individual and the occupant and to control the one or more external communication devices to emphasize an upcoming vehicle behavior of the vehicle when the occlusion module occludes the at least a portion of at least one window.

2. The occlusion system of claim 1, further comprising:
    one or more internal sensors to detect body language of the occupant,
    wherein the monitoring module further includes instructions to analyze the body language and determine whether the body language presents a communication that is inconsistent with a vehicle behavior, and
    wherein the occlusion module further includes instructions to occlude the at least a portion of at least one window when the communication is inconsistent with the vehicle behavior.

3. The occlusion system of claim 1, wherein the occlusion module further includes instructions to occlude at least one full window of the vehicle that is between the occupant and the individual.

4. The occlusion system of claim 1, wherein:
    the monitoring module further includes instructions to determine an attention direction of the individual; and
    the occlusion module further includes instructions to occlude the at least a portion of at least one window when the attention direction is toward the vehicle.

5. The occlusion system of claim 1, wherein the occlusion module further includes instructions to occlude the at least a portion of at least one window by:
    creating an occlusion having a size that is less than the full window, and
    determining a position of the occlusion on the window based at least in part on a line-of-sight estimate between the occupant and the individual.

6. The occlusion system of claim 1, wherein the one or more external communication devices include one or more of:
    one or more secondary lights,
    a light bar,
    a display panel, and
    an audio device.

7. A method of occluding communication from an occupant of an autonomously operated vehicle, comprising:
    generating sensor data indicating one or more aspects of an environment around the vehicle;

analyzing the sensor data to identify a presence of an individual outside of the vehicle;

determining a position of the individual relative to an occupant inside the vehicle;

occluding at least a portion of at least one window between the individual and the occupant; and controlling one or more external communication devices to emphasize an upcoming vehicle behavior of the vehicle simultaneously with the occluding the at least a portion of at least one window.

8. The method of claim 7, further comprising:

occluding at least one full window of the vehicle that is between the occupant and the individual.

9. The method of claim 7, further comprising:

determining an attention direction of the individual; and occluding the at least a portion of at least one window when the attention direction is toward the vehicle.

10. The method of claim 7, wherein the occluding the at least a portion of at least one window comprises:

creating an occlusion having a size that is less than the full window; and determining a position of the occlusion on the window based at least in part on a line-of-sight estimate between the occupant and the individual.

11. The method of claim 7, wherein the one or more external communication devices include one or more of:

one or more secondary lights, a light bar, a display panel, and an audio device.

12. A method of occluding communication from an occupant of an autonomously operated vehicle, comprising:

generating sensor data indicating one or more aspects of an environment around the vehicle;

analyzing the sensor data to identify a presence of an individual outside of the vehicle determining a position of the individual relative to an occupant inside the vehicle;

occluding at least a portion of at least one window between the individual and the occupant;

detecting body language of the occupant using one or more internal sensors;

determining whether the body language presents a communication that is inconsistent with a vehicle behavior; and occluding the at least a portion of at least one window when the communication is inconsistent with the vehicle behavior.

13. A non-transitory computer-readable medium for occluding communication from an occupant of an autonomously operated vehicle, including instructions that, when executed by one or more processors, cause the one or more processors to:

generate sensor data indicating one or more aspects of an environment around the vehicle;

analyze the sensor data to identify a presence of an individual outside of the vehicle determine a position of the individual relative to an occupant inside the vehicle;

occlude at least a portion of at least one window between the individual and the occupant; and control one or more external communication devices to emphasize an upcoming vehicle behavior of the vehicle simultaneously with the occluding the at least a portion of at least one window.

14. The non-transitory computer-readable medium of claim 13, further comprising instructions to:

detect body language of the occupant using one or more internal sensors;

determine whether the body language presents a communication that is inconsistent with a vehicle behavior; and occlude the at least a portion of at least one window when the communication is inconsistent with the vehicle behavior.

15. The non-transitory computer-readable medium of claim 13, further comprising instructions to:

occlude at least one full window of the vehicle that is between the occupant and the individual.

16. The non-transitory computer-readable medium of claim 13, further comprising instructions to:

determine an attention direction of the individual; and occlude the at least a portion of at least one window when the attention direction is toward the vehicle.

17. The non-transitory computer-readable medium of claim 13, wherein the instructions to occlude the at least a portion of at least one window comprise instructions to:

create an occlusion having a size that is less than the full window; and determine a position of the occlusion on the window based at least in part on a line-of-sight estimate between the occupant and the individual.

* * * * *

UNITED STATES PATENT AND TRADEMARK OFFICE
CERTIFICATE OF CORRECTION

PATENT NO. : 11,151,366 B2
APPLICATION NO. : 16/777010
DATED : October 19, 2021
INVENTOR(S) : Austin et al.

Page 1 of 1

It is certified that error appears in the above-identified patent and that said Letters Patent is hereby corrected as shown below:

In the Claims

Column 19, Claim 12, Line 6: "outside of the vehicle" should be "outside of the vehicle;"

Column 20, Claim 13, Line 9: "outside of the vehicle" should be "outside of the vehicle;"

Signed and Sealed this
First Day of March, 2022

Drew Hirshfeld
*Performing the Functions and Duties of the
Under Secretary of Commerce for Intellectual Property and
Director of the United States Patent and Trademark Office*